United States Patent [19]

Corpron et al.

[11] Patent Number: 4,806,016
[45] Date of Patent: Feb. 21, 1989

[54] OPTICAL DISPLACEMENT SENSOR

[75] Inventors: Gary P. Corpron, Chanhassen; Lowell A. Kleven, Eden Prairie, both, Minn.; Lawrence A. Johnson, Bozeman, Mont.

[73] Assignee: Rosemount Inc., Eden Prairie, Minn.

[21] Appl. No.: 49,628

[22] Filed: May 15, 1987

[51] Int. Cl.⁴ ............................................. G01J 5/16
[52] U.S. Cl. ................................ 356/373; 73/861.24; 250/227
[58] Field of Search ................. 356/373, 375; 250/227; 73/861.47, 861.22, 861.24

[56] References Cited

U.S. PATENT DOCUMENTS

| | | | |
|---|---|---|---|
| 4,206,642 | 6/1980 | Bearcroft | 73/194 |
| 4,368,430 | 1/1983 | Dale et al. | 250/227 |
| 4,372,165 | 2/1983 | Pitt et al. | 73/861 |
| 4,414,471 | 11/1983 | Rines | 250/227 |
| 4,416,159 | 11/1983 | Williamson et al. | 73/861 |
| 4,470,310 | 9/1984 | Tsuruoka et al. | 73/861 |
| 4,472,022 | 9/1984 | Bearcroft et al. | 350/96.29 |
| 4,501,157 | 2/1985 | Perkinson et al. | 73/861 |
| 4,584,883 | 4/1986 | Miyoshi et al. | 73/861 |
| 4,594,450 | 6/1986 | Coursolle et al. | 250/227 |
| 4,626,680 | 12/1986 | Martens et al. | 250/227 |

FOREIGN PATENT DOCUMENTS

2165645  4/1986  United Kingdom ................ 356/373

*Primary Examiner*—Richard A. Rosenberger
*Attorney, Agent, or Firm*—Kinney & Lange

[57] ABSTRACT

The optical displacement sensor modulates intensity of the light beam as a function of the physical displacement. The sensor includes a reflector positioned in a path of the light beam between a light source and a light detector. The reflector has a non-reflective portion surrounded by a reflective portion. Relative movement (displacement) of the beam and the reflector occurs as a function of a parameter which is being sensed. In a normal (no displacement) condition, the non-reflective portion can be positioned with respect to the light beam so that intensity of the light beam received by the detector is at a minimum, and the sensor is operating in a darkfield mode. Displacement from the normal position causes an increase in the light intensity received by the detector.

37 Claims, 6 Drawing Sheets

OPTICAL DISPLACEMENT SENSOR

BACKGROUND OF THE INVENTION

1. Field of the Invention

The present invention relates to optical sensors which modulate light responsive to a parameter which causes a physical displacement.

SUMMARY OF THE INVENTION

The present invention is an improved optical displacement sensor which reduces the effects of cable bending noise on a light beam generated by the sensor. The sensor of the present invention operates in a "dark field" mode in which the measured intensity of the light beam at a selected displacement position is at a minimum. With the sensor of the present invention, a light beam is transmitted along a path to a reflector which has a non-reflecting portion surrounded by a reflecting portion. In the selected position, the non-reflecting portion is positioned with respect to the light beam so that the intensity of the beam reflected is essentially a minimum. Relative displacement of the reflector with respect to the beam in a direction essentially perpendicular to the path causes increases in intensity of the beam with increasing displacement from the selected position. The dark field mode of operation can reduce noise contribution due to cable bending relative to the intensity of the light beam without sacrificing displacement sensitivity.

Automatic alignment is achieved by initially assembling the sensor with a reflector which is uniformly reflective. A high intensity light beam from an intense light source is transmitted through the sensor to burn or evaporate a hole in the reflective coating of the reflector, thereby producing the non-reflecting area which is surrounded by the reflecting areas of the reflector. Because the non-reflecting area is formed in situ, alignment errors between the remaining components of the optical sensor are eliminated.

DETAILED DESCRIPTION OF THE PREFERRED EMBODIMENTS

Figure 1:
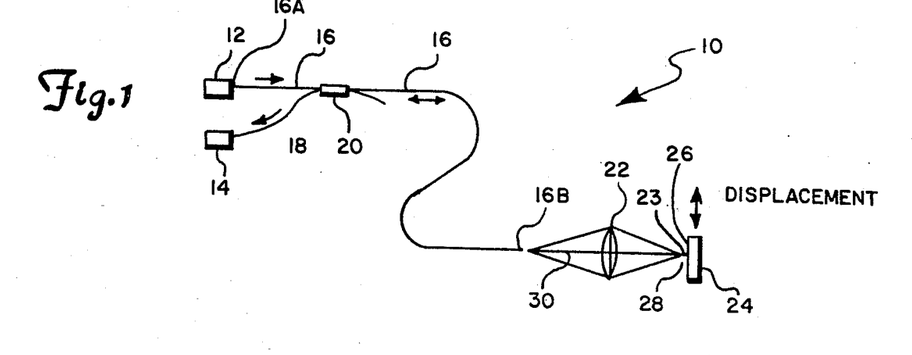
FIG. 1 shows an embodiment of the optical displacement sensor of the present invention which operates in the darkfield mode.

FIG. 1 shows an optical displacement sensor 10 which reduces the level of cable bending noise relative to the intensity of a light beam by operating in a darkfield mode. Sensor 10 includes emitter 12, detector 14, optical fibers 16 and 18, bidirectional coupler 20, lens 22 and movable target 24.

Emitter 12 emits electromagnetic radiation, which will be referred to as "light" or "optical" and which is intended to include wavelengths in the infrared, visible and ultraviolet spectrum. The light is transmitted along optical fiber 16 from input end 16A to output end 16B. Lens 22 focuses the light from output end 16B of fiber 16 to a light spot 23 at or very near the front surface of target 24. Target 24 has a reflective surface coating 26 with an opaque or nonreflecting spot 28.

When there is a selected displacement of target 24 relative to optical axis 30, nonreflecting spot 28 is aligned with focused light spot 23, and substantially no light is reflected back from target 24 to output end 16B of fiber 16. As a result, the signal produced by detector 14 (which depends upon the light which is traveling back along fiber 16 through bidirectional coupler 20 and fiber 18) is a minimum. When target 24 is displaced laterally away from the selected displacement (i.e. in a direction generally perpendicular to optical axis 30), part of focused light spot 23 falls on reflective surface 26 and is returned to output end 16B of fiber 16 by lens 22. This results in light being transmitted back to detector 14.

Two major problems which are associated with many optical sensors, including optical displacement sensors proposed for vortex shedding flowmeters, are (1) the tight alignment and fabrication tolerances required to achieve high sensitivity, and (2) the presence of noise induced by optical cable bending loss variations. In order to achieve submicroinch displacement sensitivities, parts must often be aligned within a fraction of a thousandth of an inch. Although this can be easily done on an experimental basis in the laboratory, high precision alignment can be very expensive to achieve in production.

Light attenuation in optical cable depends on many factors including the intrinsic material absorption of the fiber, temperature, and cable bending. Even a well made optical cable will exhibit loss variation of 0.01 db to 0.001 db when subjected to small vibrations. These loss variations result in a noise signal approximately 30 db to 40 db below the DC light level. For an optical vortex flowmeter under worst case conditions, this is also the level of the signal, which results in an unacceptable signal-to-noise ratio.

In this darkfield mode of operation, the reflected light level is essentially zero at the selected displacement. Bending or vibration of cables 16, 18 modulates the intensity of the light from source 12 and also modulates the reflected light level received by detector 14. This modulation introduces noise into the detector 14 which is proportional to the reflected light level. When the selected position is chosen to be the rest position (no displacement position), the reflected light level is essentially zero at the rest position and hence the noise due to cable bending received at detector 14 is also essentially zero. When the selected position is chosen to be the rest position, the sensor is essentially free of cable bending noise when there is no input or displacement to the sensor. When the selected position is chosen to be the rest position, cable bending noise goes up only when the input displacement and the reflected light level go up and hence a desired high signal-to-noise ratio is maintained over a range of sensor displacement. This arrangement is especially desirable when the detector 14 includes automatic gain control (AGC) circuitry which can respond undesirably to noise when there is no input to the sensor.

Alternatively, the selected position can be chosen at a nonzero displacement which provides a high rate of change of light intensity as a function of displacement. In this arrangement the high sensitivity of the detector to alternating displacements provide a sensor signal which is large with respect to the cable bending noise, and hence a high signal-to-noise ratio is maintained over a range of sensor displacement. As a result, there is negligible noise contribution due to cable bending. The darkfield optical displacement sensor 10 of FIG. 1 achieves improved immunity to cable bending loss and noise, without sacrificing sensitivity.

Figure 2:
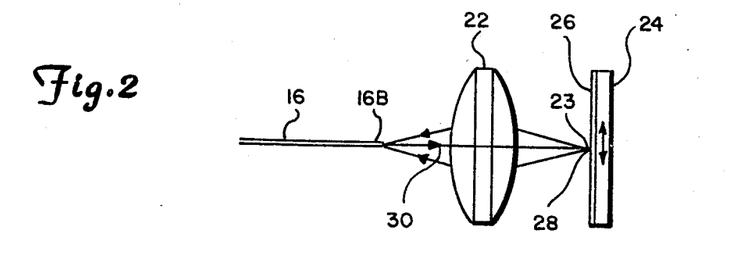
FIG. 2 is a view of the optical fiber, lens and moving target used in one embodiment of the optical displacement sensor of the present invention.

The darkfield optical displacement sensor of the present invention also offers a significant advantage in fabrication to high tolerances by offering an automatic alignment which can be achieved during fabrication of the sensor. FIG. 2 illustrates this automatic alignment feature. As shown in FIG. 2, light from fiber 16 is focused by lens 22 onto reflective surface 26 of target 24. Reflective surface 26 is a reflective coating formed of a material which is highly reflective at the operating wavelength normally used by sensor 10 but is absorbing at a different wavelength. Initially there will not be a nonreflecting spot 28 on target 24 and sensor 10 will be assembled without any special alignment. Once assembled, an intense light source (not shown) operating at a wavelength absorbed by reflective surface coating 26 is introduced into fiber 16 at the selected displacement. Light exiting fiber 16 is focused onto reflective surface coating 26 by lens 22 and burns or evaporates a hole in coating 26. This hole is nonreflecting spot 28 because the underlying target 24 is transparent or otherwise nonreflecting.

This procedure produces the required nonreflecting spot 28 in exactly the correct position. Because nonreflecting spot 28 is not formed until optical displacement sensor 10 is fully assembled, there are no subsequent shifts of relative positions which result in any misalignments of nonreflecting spot 28 with respect to optical axis 30.

Figure 3:
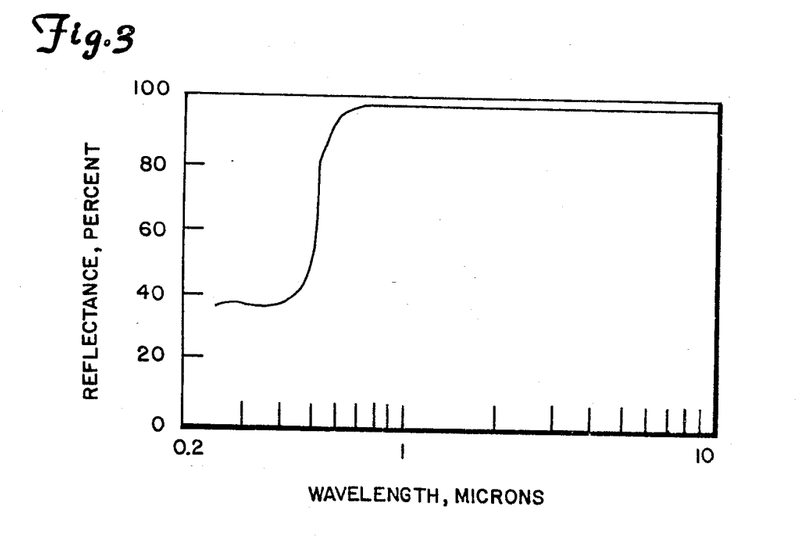
FIG. 3 is a graph showing the spectral reflectivity of gold.

One material which is suitable for coating 26 is gold. FIG. 3 shows the reflectivity of gold as a function of wavelength. As shown in FIG. 3, gold is highly reflective above about 800 nm, yet absorbs about sixty percent of incident light at wavelengths below 500 nm. One suitable intense light source that is absorbed by a gold coating is an argon laser operating at 488 nm. A large argon laser is capable of as much as 10 watts CW operating multiline at wavelengths below 500 nm. When focused to a 50 micron diameter spot, the result is a power density of about 500 kW/cm$^2$. Such a laser can be used to evaporate a hole in coating 26 thus creating spot 28. In other embodiments, a neodymium doped yttrium aluminum garnet (Nd:YAG) laser operated in a Q-switched mode is used to evaporate or burn holes in coating 26.

Figure 4:
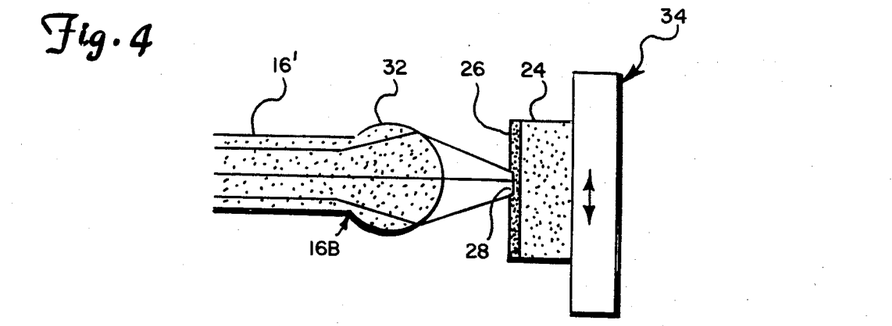
FIG. 4 shows an optical displacement sensor in which the optical fiber includes an integral ball lens.
Figures 5, 6:
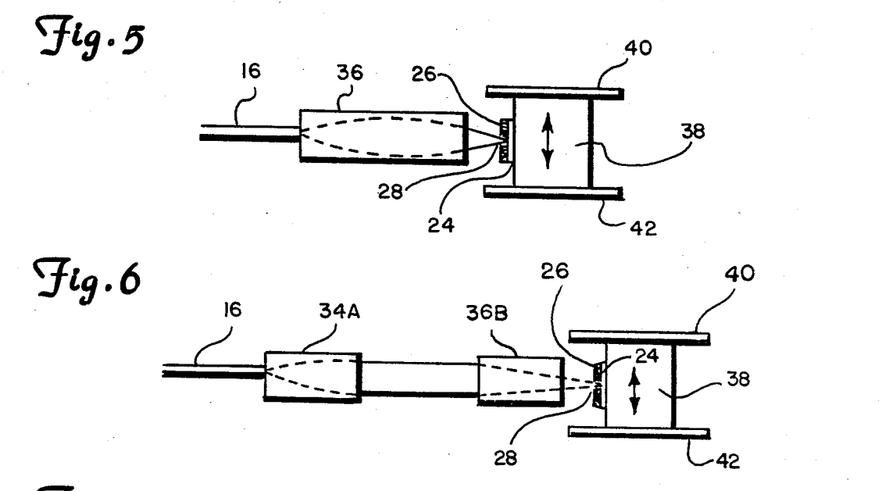
FIG. 5 shows another embodiment of the optical displacement sensor which uses a single GRIN lens.
FIG. 6 shows another embodiment of the optical dislacement sensor which uses a pair of GRIN lenses.

FIGS. 4, 5 and 6 show other embodiments in which lens 22 is replaced by other components. In FIG. 4, optical fiber 16' has an integral ball lens 32 at its output end 16B. Ball lens 32 focuses the light onto reflective surface coating 26 and, as shown in FIG. 4 onto nonreflecting spot 28 in the selected displacement condition. In the embodiment shown in FIG. 4, target 24 is mounted on and moves with movable member 34, which moves in the direction shown by the double-headed arrow.

FIG. 5 shows another embodiment in which lens 22 has been replaced by a graded index (GRIN) lens 36. Target 24 is mounted on spool 38, which in turn is connected to a pair of diaphragms 40 and 42. Displacement of spool 38 and target 24 in the direction shown by the double-headed arrow depends upon differential pressure applied to diaphragms 40 and 42.

FIG. 6 shows another embodiment which is essentially the same as FIG. 5, except that focusing is provided by a pair of GRIN lenses 36A and 36B.

in each of the embodiments shown in FIGS. 2 and 4–6, the sensitivity of the darkfield optical displacement sensor 10 is limited by the diameter of focused light spot 23 at target 24. For example, the integral ball lens 32 shown in FIG. 4 provides some focusing action which increases the sensitivity over what is possible with a single cleaved fiber end. However, for a 0.25 numerical aperture (NA) fiber, a demagnification of about 0.5X is a practical limit as to how small the light spot 23 can be focused since in this limiting case the NA of the focused beam is 0.5 (roughly f/1) and larger NA's result in large aberrations in simple refractive optical systems. In other words, light spot 23 would get blurry due to aberrations.

Figure 7:
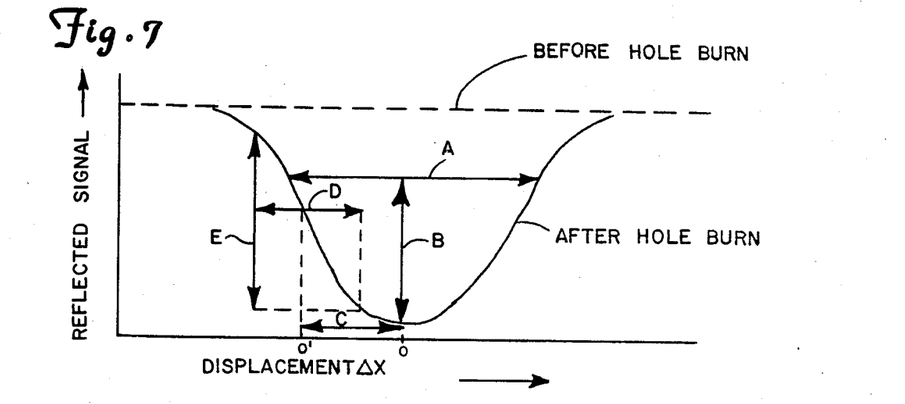
FIG. 7 shows a graph of reflected signal as a function of displacement from the optical axis for the optical displacement sensor both before and after a hole has been burned in the mirror coating.

FIG. 7 shows sensor response as a function of target displacement before and after the evaporating of hole 28. Note that the sensitivity of the sensor depends on the maximum slope provided by this response function.

The darkfield sensor of the present invention gets its name from the fact that the optimum operating condition for the sensor results when it is mechanically biased so that the sensor is focused at least partially on the darkfield provided by the evaporated spot as shown by the solid curve in FIG. 7.

When the selected position is chosen to be the rest position (zero displacement), the solid curve in FIG. 7 is centered around a rest position "0" in FIG. 7. In this case an alternating input signal "A" produces an alternating reflected signal "B" from the sensor at twice the frequency of the input signal.

When a selected position "0" is chosen to be at a non-zero displacement "C" relative to a rest position "0" in FIG. 7, an alternating input signal "D" produces an alternating reflected signal "E" at the same frequency as the input signal from the sensor as shown in FIG. 7.

Figure 8:
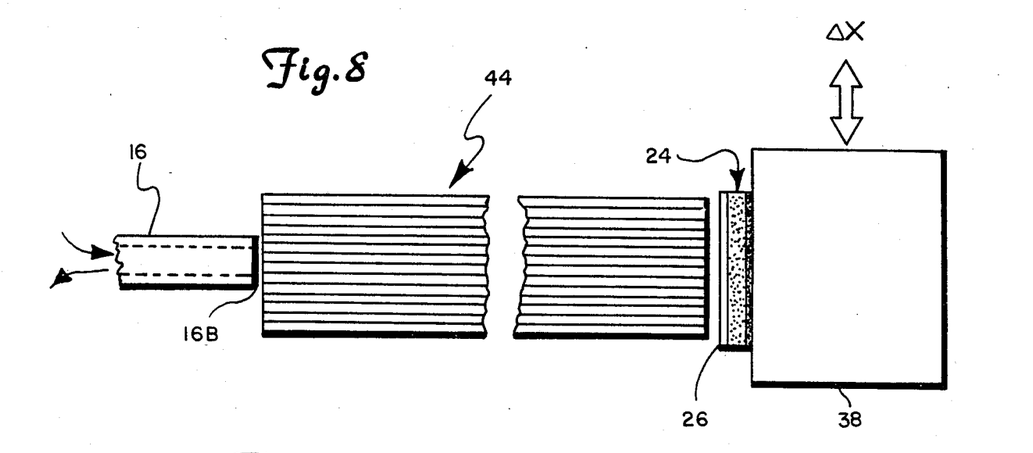
FIG. 8 shows another embodiment of the optical displacement sensor which includes a randomized fiber optic bundle positioned between the input fiber and the reflective target.
Figure 9A:
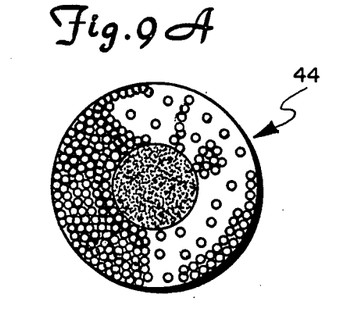
FIG. 9A is a end view of the input end of the fiber bundle of FIG. 8, showing illumination of the input end.
Figure 9B:
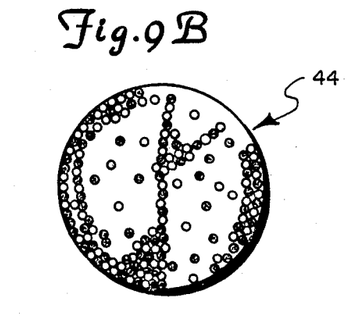
FIG. 9B is an end view of the output end of the fiber bundle of FIG. 8, showing illumination at the output end.
Figure 10:
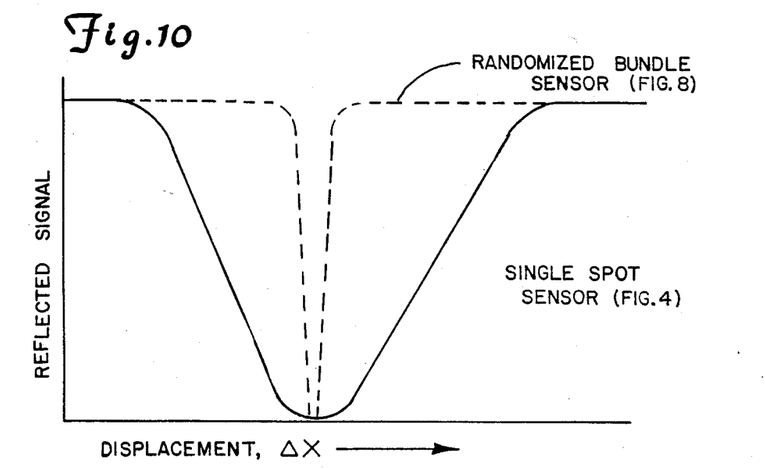
FIG. 10 is a graph showing sensor response to displacement with and without the randomized fiber bundle of FIG. 8.

FIGS. 8-10 illustrate an embodiment of the present invention which increases the sensitivity of the darkfield sensor by interposing a randomized fiber-optic bundle 44 to interface between output ends 16B of fiber 16 and reflective target 24. The individual fibers of bundle 44 are preferably very small. In one embodiment the individual fibers have a diameter which is about one-tenth the diameter of fiber 16. As illustrated in FIG. 9A, light leaving the end 16B of fiber 16 is coupled into many fibers at the input end of bundle 44. At the output end of bundle 44, as shown in FIG. 9B, the light is randomized into a plurality of individual separated spots. For purposes of illustration, the illuminated fibers at both the input and output ends of bundle 44 are shown as dark in FIGS. 9A and 9B. The small randomized fibers of bundle 44 result in many small holes being burned through coating 26, rather than a single hole as illustrated in FIGS. 2 and 4-6. Since the sensitivity of the sensor depends on the size of the fiber and the size of the burned hole or holes, a significant improvement in sensitivity results. FIG. 10 shows a comparison of sensor response functions for a single spot darkfield sensor such as shown in FIG. 4 and the darkfield sensor of FIG. 8 which uses a randomized fiber bundle.

Figure 11:
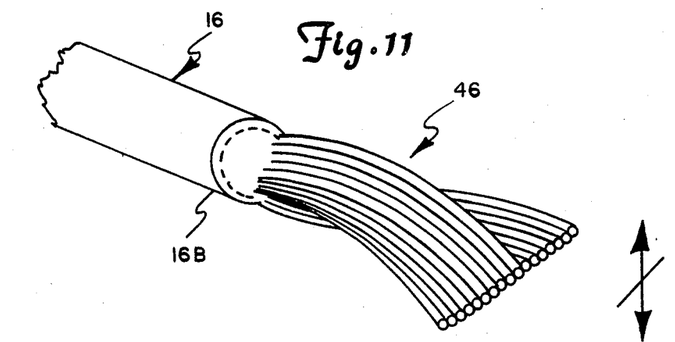
FIG. 11 shows another embodiment which uses a fiber bundle.

In order to achieve improved sensitivity, the fiber bundle which interfaces fiber 16 with target 24 does not necessarily have to be randomized. FIG. 11 shows another embodiment that reduces the effective spot size in the displacement direction, but still retains the sensitivity and automatic alignment characteristics. In this embodiment, fiber bundle 46 is of a "round to line" type, so that the input end of bundle 46 is circular and basically conforms to the output end 16B of fiber 16. The output end of bundle 46 is a line which is generally perpendicular to the direction of target motion.

Figure 12:
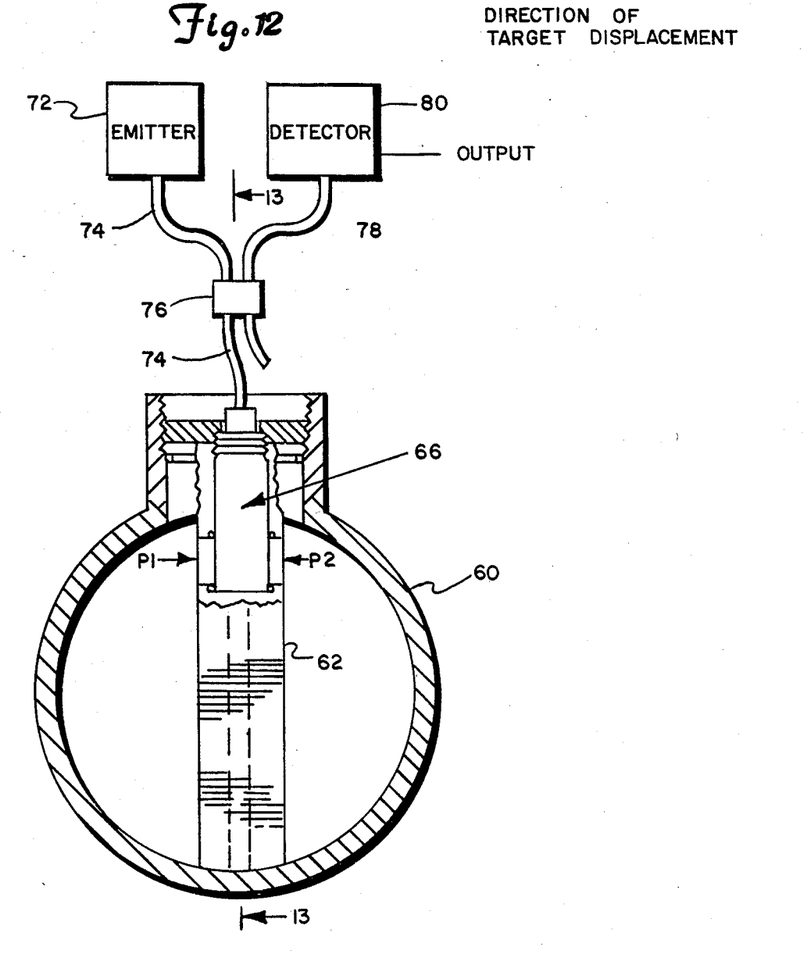
FIG. 12 is a sectional view, with portions broken away, of a vortex shedding flowmeter using the optical displacement sensor of the present invention.
Figure 13:
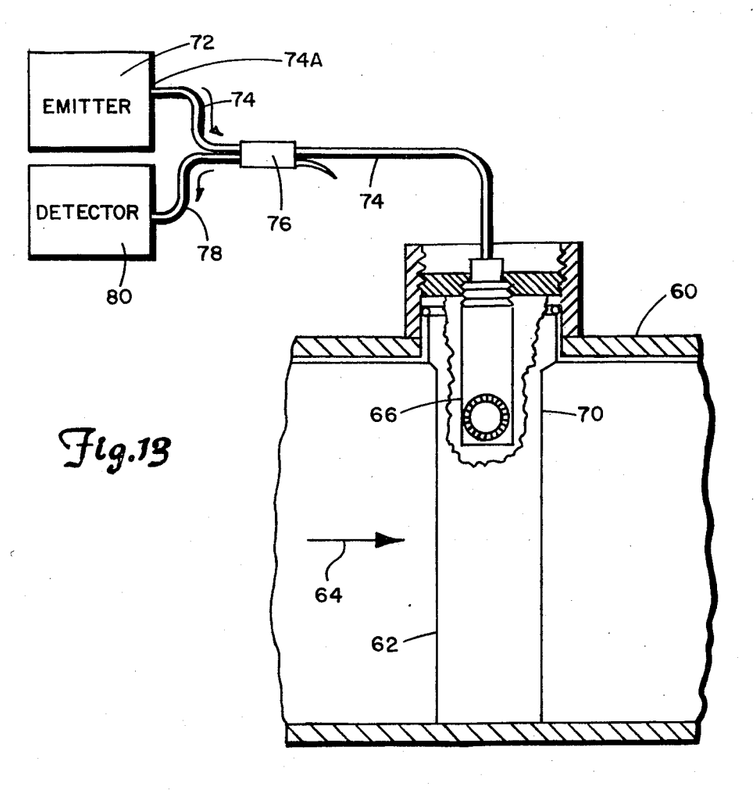
FIG. 13 is a sectional view along section 13—13 of FIG. 12.
Figure 14:
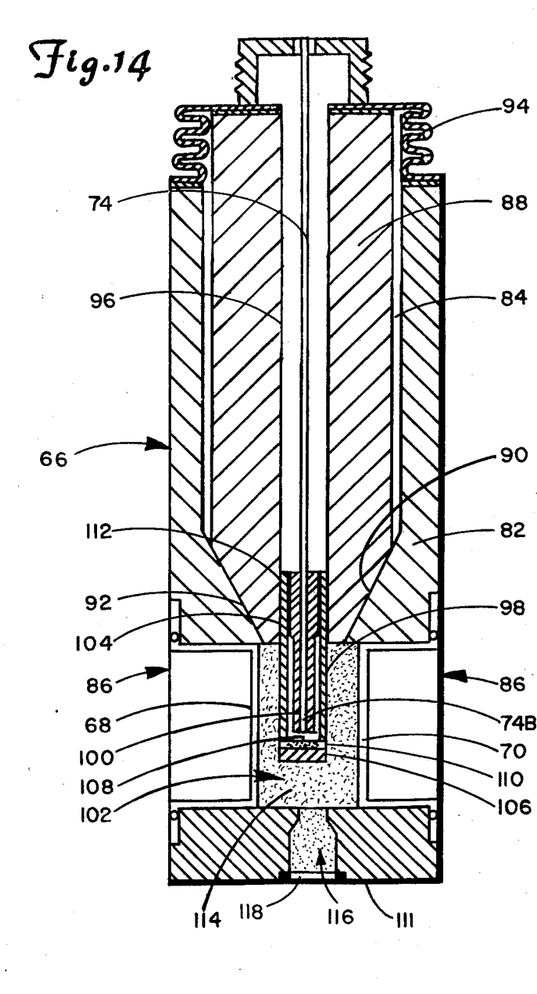
FIG. 14 is a sectional view of the optical displacement sensor of the flowmeter of FIGS. 12 and 13.

FIGS. 12-14 show a vortex flowmeter using the embodiment of the darkfield optical displacement sensor of the present invention. The flowmeter senses flow of fluid through pipe 60. A vortex creating body 62 is positioned within pipe 60 and is oriented in a direction which is generally perpendicular to the direction of fluid flow (represented by arrow 64 in FIG. 13). Optical displacement sensor 66 is mounted in body 62, and has a pair of diaphragms 68 and 70 (FIG. 14) positioned on opposite sides to receive pressures P1 and P2 shown in FIG. 12. Light is supplied from emitter 72 to input end 74A of optical fiber 74, and is guided through optical fiber 74 to optical displacement sensor 66. Light returning from optical displacment sensor 66 returns through fiber 74 and is coupled by bidirectional coupler 76 to optical fiber 78 and then to detector 80. The output of detector 80 is an electrical signal which is representative of the differential pressure (i.e. the pressure difference between P1 and P2) which is sensed by optical displacement sensor 66.

FIG. 14 shows optical displacement sensor 66 in further detail. Optical sensor 66 has a main housing 82 with a longitudinal bore 84 which extends from its distal end and which intersects a transverse bore 86. Diaphragms 68 and 70 are mounted in opposite sides of transverse bore 86. Positioned within longitudinal bore 84 is carrier 88 which has a conical outer surface 90 at its inner end which mates with conical inner surface 92 of bore 84. Bellows 94 is attached between the outer end of carrier 88 and the distal end of housing 82 to urge carrier 88 in a direction which keeps conical surfaces 90 and 92 mated.

Carrier 88 has an internal bore 96 through which optical fiber 74 extends. At the inner end of carrier 88 there are a pair of concentric cylinders or tubes 98 and 100. Outer tube 98 extends from bore 96 into cavity 102 (which is that portion of bore 86 which is located between diaphragms 68 and 70). Outer tube 98 is bonded by adhesive 104 to carrier 88 and extends in cantilevered fashion into cavity 102. Mounted at the distal end of outer tube 98 is target 106, which has a hole 108 formed in reflective coating 110. Inner tube 100 is bonded to outer tube 98 by bonding layer 112 and supports output end 74B of optical fiber 74. As shown in FIG. 14, output end 74B of fiber 74 is positioned close to, but spaced apart from reflective coating 110 and hole 108.

Cavity 102 is filled with a filler material 114 so that diaphragms 68 and 70 are coupled together, and any movement of diaphragms 68 and 70 causes movement of outer tube 98. Inner tube 100 and optical fiber 74, however, do not move when outer tube 98 moves, and therefore relative movement of hole 108 with respect to output end 74B of fiber 74 is caused as a function of the differential pressure to diaphragms 68 and 70. As hole 108 is moved relative to output end 74B of optical fiber 74, the reflected light is modulated to produce an output from detector 80.

Passage 116 in the end of housing 82 permits filling and emptying of the filler material 114 from cavity 102. Plug 118 closes passage 116 during normal operation of sensor 66.

The length of outer tube 98 is chosen to allow proper motion while staying within the stress limitations of the tube at maximum deflections. The length and dimensions of inner tube 100 to its connection with outer tube 98 is chosen so that its flexure due to acceleration and vibration forces is the same as outer tube 98, diaphragms 68 and 70, and filler material 114 under the same acceleration forces. In this manner, acceleration compensation is achieved.

For acceleration compensation to function properly for any axis of vibration, hole 108 in reflective coating 110 should be a dark line orthogonal to the direction of diaphragm motion. To produce this line, optical sensor 66 is vibrated orthogonally to the axis of diaphragm motion and a high intensity laser is pulsed to provide high intensity light through optical fiber 74 which will cause a portion of reflective coating 110 to be vaporized. The laser is pulsed until hole 108 is in the form of a line orthogonal to the diaphragm motion axis.

In another embodiment of the present invention, tubes 98 and 100 are of a rectangular rather than a circular cross-section. This rectangular configuration causes tubes 98 and 100 to be very stiff in the direction orthogonal to diaphragm motion and quite flexible in the direction of diaphragm motion. This is achieved by making the dimension of the rectangular tubes be smaller in the direction of diaphragm motion and much larger in the direction perpendicular to diaphragm motion. The disadvantage of rectangular tubes, of course, is their low strength compared to round tubes, under hydrostatic pressure (which results from pressurization of the filler material 114 by external static pressure).

In order to ensure proper acceleration compensation, a method of adjusting the effective dimension of tubes 98 and 100 is desirable. One method of achieving this adjustability is to add precise amounts of adhesive between tubes 98 and 100 until the effective length of inner tube 100 is properly adjusted. The adhesive can, for example, be a braze for metal tubes or metallized ceramic tubes, or a glass frit for ceramic or glass tubes.

One problem which is encounterd in the development of optical sensors for vortex flowmeters is the effects of thermal expansion on the entire optical system. The optical sensor must, in many cases, operate over a very large temperature range (for example, −40° F. to 1000° F.). The very low thermal coefficient of expansion of quartz optical fibers with the much larger thermal coefficient of expansion of other materials used in the sensor, such as stainless steel, affect dimensions within the sensor which can result in changes in output. The embodiment of the present invention shown in FIG. 14 permits inner and outer tubes 100 and 98 to be made of the same materials so that changes in temperature should not significantly affect the change in dimensions between the end of fiber 74 and reflective coating 110. To minimize the effect, tubes 98 and 100 can, for example, be made of quartz.

Another complication is that optical fiber 74 has to be connected to a connector at relatively low temperatures, while end 74B of optical fiber 74 has to be attached to inner tube 100 near target 106. Since optical fiber 74 and carrier 88 are preferably made of quartz with a very low thermal coefficient of expansion, and housing 82 is preferably made of metal such as stainless steel, fiber 74 has to have excess material length at room temperature to accommodate the expansion a high temperatures to which sensor 66 will be exposed. FIG. 14 shows a structure for overcoming this problem. The conical surface 90 of carrier 88 preferably has its apex in the center of cavity 102—i.e. along the central axis of transverse bore 86. Since thermal expansion does not change angles, the apex will stay in the same place and motion accommodation will occur at the conical surfaces of quartz carrier 88 and stainless steel housing 82. Bellows 94 provides both a seal as well as a bias force to keep the conical surfaces 90 and 92 mated.

Figure 15:
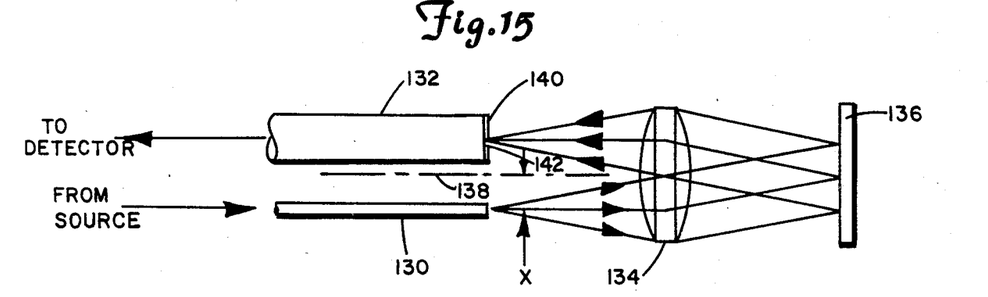
FIG. 15 is a diagram showing another embodiment of the optical displacement sensor of the present invention.

Still another embodiment of the optical displacement sensor of the present invention is shown in FIG. 15. This embodiment uses a pair of fibers 130 and 132, lens 134 and mirror 136.

Light from a source such as a light emitting diode not shown) is transmitted through first fiber 130 that is fixed at its output end to an object (not shown) whose position changes are to be detected. The end of fiber 130 (or the image formed by this fiber if the end is in the form of a lens) is placed in the focal plane of lens 134 and is offset from lens axis 138 by a distance X that is less than the radius of lens 34. Lens 34 is fixed to a mechanical ground, and the motions of the object that are to be detected are relative to this mechanical ground. Light from fiber 130 is directed toward lens 134, and because fiber 130 (or its focal point) is in the focal plane of lens 134, the light is collimated by lens 134. The collimated light proceeds from lens 134 toward plane mirror 136, whose surface is perpendicular to optic axis 138. Mirror 136 is fixed to the same mechanical ground as is lens 134. The light is reflected from mirror 136 and is redirected back toward lens 134. Lens 134 focuses the light at a point lying on a line that intersects and is perpendicular to axis 138 and which passes through the point defined by the end of first fiber 130 (or its focal point).

Second fiber 132 is fixed to the first fiber 130 so that fibers 130 and 132 move together as the object (not shown) moves. Second fiber 132, which is positioned so that it receives the light reflected from mirror 136 after the light has passed through lens 134 for the second time and is refocused in the image plane, can be quite large in diameter. The end of second fiber 132 is coated with coating 140, which is a material (such as platinum or gold) that does not permit light to pass into fiber 132 except where hole 142 has been formed in coating 140. Hole 142 may be formed after assembly with the system in its rest position. Alternatively, hole 142 is formed after the sensor has been assembled by initially displacing fibers 130 and 132 relative to their rest position and transmitting an intense pulse of light through the system. An image of this pulse is formed on the end of second fiber 132, and hole 142 is consequently evaporated or burned through coating 140. With the proper choice of initial displacement, approximately half of this hole 142 will be illuminated during measurements by the less intense measurement light beam when the system is at its zero displacement or equilibrium position. The direction of the initial displacement used to create hole 142 should be approximately the same direction as the displacement to be sensed. When the two fibers are displaced from their equilibrium position during sensing, the image of the light beam formed in front of or near the surface of the second fiber 132 is displaced from its equilibrium position in a direction opposite the direction of displacement of the fiber pair. The magnitude of this displacement is equal to the displacement of the fiber pair but because it is in the opposite direction, the relative displacement of the image formed on the end of fiber 132 and the hole 142 is twice the displacement of the fiber pair. Thus there is a gain of two in sensitivity over optical displacement sensors which use a single optical fiber and a mirror.

It should be noted that the distance X between the axis of the optical fiber 130 and the optical axis 138 need not be in the same direction as the motion to be detected. No loss of sensitivity results if this distance and the displacement to be sensed are in different directions. It is only important that the image of the end of first fiber 130 lie in the receiving area of hole 142 at the end of second fiber 132 for the entire range of displacements encountered. This is accomplished with the assembly procedure already described and consequently the sensor of FIG. 15 is very tolerant of alignment errors.

Figure 16:
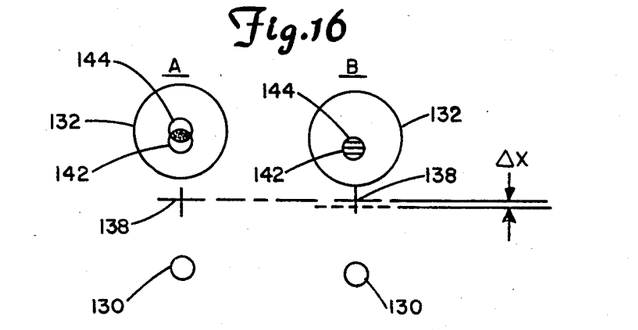
FIG. 16 is a diagram showing the light illumination, at the ends of the input and output fibers, of the optical displacement sensor of FIG. 15.

FIGS. 16A and 16B are diagrams which show the ends of fibers 130 and 132 at two different displacement positions with respect to optical axis 138. In the position shown in FIG. 16A, the location of light spot 144 only partially overlaps hole 142, as shown by the shaded area. In the position shown in FIG. 16B, hole 142 and light spot 144 coincide. As a result, when fibers 130 and 132 move relative to optical axis 138 the intensity of light received by fiber 132 changes.

Although the embodiment shown in FIG. 15 uses a separate lens 134 and mirror 136, in other embodiments of the present invention lens 134 and mirror 136 are replaced by a grin lens having a reflective coating at one end. In either embodiment, because lens 134 (or the grin lens) is not mounted to the component being moved, it does not contribute to an increased mass of the element and therefore to an increased sensitivity to vibration. The use of a separate lens 134 and mirror 136 is particularly advantageous where high temperatures limit the use of a grin lens because of diffusion of the dopant used to make the grin lens. Thus, for example, lens 134 and mirror 136 can be made from saphire.

In still other embodiments of the present invention, lens 134 and mirror 136 are moved, while fibers 130 and 132 remain stationary. This will also provide the same sensitivity, since the sensor merely depends upon relative displacement of optical axis 138 with respect to fibers 130 and 132.

Further improvements in sensitivity of the sensor can be achieved by reducing the size of the image formed at second fiber 132. This results in a reduction in the size of hole 142, and therefore causes an increase in sensitivity because the sensor goes from a fully ON state to a fully OFF state over a distance equal to about one-half of the diameter of hole 142.

Figure 17:
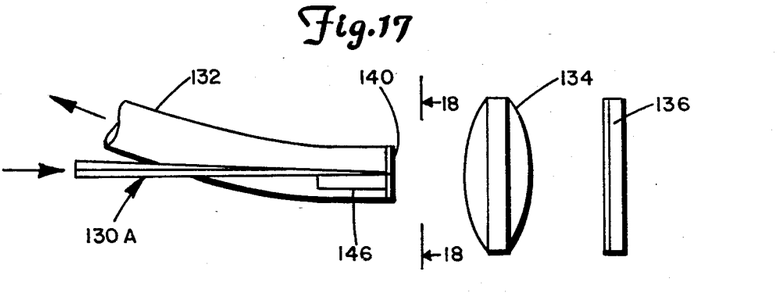
FIG. 17 shows another embodiment of the optical displacement sensor of the present invention.
Figure 18:
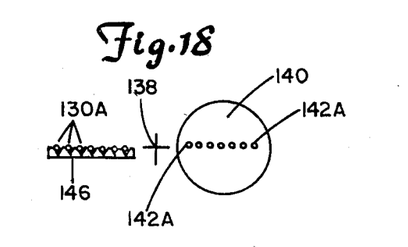
FIG. 18 is a view along line 18—18 of FIG. 17.

There are practical limits, however, to the reduction of the diameter of optical fiber 130—one of which is that fiber 130 might become significantly smaller than the light source. In that case, considerable light would be wasted with the use of only one very small fiber. FIGS. 17 and 18 show another embodiment of the present invention in which optical fiber 130 has been replaced by optical fiber bundle 130A. At its input end, optical fiber bundle 130A has a generally circular cross-section that covers much of the emitting surface of the light source. At its output end, bundle 130A is arranged linearly, with the ends of the individual fibers being supported by substrate 146. The result is an array of holes 142A in coating 140, rather than a single hole 142 produced when there is a single fiber 130 (as in FIG. 15). The size of each hole 142A is determined by the diameter of the individual fibers of bundle 130A. The small size of holes 142A in combination with an ability to use more of the light emitted from the light source yields improved signal-to noise ratio and displacement sensitivity.

In conclusion, improved sensitivity and automatic alignment in an optical displacement sensor are achieved with the present invention. Although the present invention has been described with reference to preferred embodiments, workers skilled in the art will recognize that changes may be made in form and detail without departing from the spirit and scope of the invention. For example, although the present invention has been specifically described in the context of a vortex flowmeter sensor, other applications for displacement or motion sensing can also take advantage of the optical sensor of the present invention. While the shape of the nonreflective region in the reflector has been shown to be round, or a line or a random pattern, other shapes such as square or triangular can work as well.

What is claimed is:

1. An optical displacement sensor for modulating intensity of an optical beam, the optical displacement sensor comprising:
   guide means for guiding the optical beam along a path;
   target means positioned in the path and having a nonreflective portion which is surrounded by a reflective portion, the nonreflective portion having been formed from the reflective portion in situ by a beam which was guided along the path by the guide means and which altered a reflective characteristic of the target means, the nonreflective portion having a shape and alignment with respect to the path resulting from the in situ formation; and
   displacement means for causing relative displacement of the target means with respect to the path in a direction essentially perpendicular to the path to cause a modulation in the intensity of the optical beam.

2. The sensor of claim 1 wherein the displacement means causes the target means and the optical beam to be positioned, when in a no displacement condition, such that intensity of the optical beam is at less than maximum intensity and such that displacement from the no displacement condition causes a change in the intensity of the optical beam from the optical displacement sensor.

3. The sensor of claim 1 wherein the target means includes a reflective layer with a hole therein which is the nonreflective portion.

4. The sensor of claim 1 wherein the guide means includes optical waveguide means having an end from which the optical beam is transmitted toward the target means and at which the optical beam is received from the target means.

5. The sensor of claim 4 wherein the guide means further includes lens means for focusing light positioned between the end of the optical waveguide means and the target means.

6. The sensor of claim 4 wherein the guide means further includes a plurality of optic fibers having first ends positioned adjacent the end of the optical waveguide means and second ends positioned adjacent to and spaced from the target means.

7. The sensor of claim 6 wherein the second ends of the optic fibers are arranged in a line.

8. The sensor of claim 6 wherein the second ends are arranged randomly and at spaced apart positions.

9. The sensor of claim 4 wherein the displacement means includes:
   a pair of diaphragms positioned on opposite sides of the target means; and
   means for coupling together the diaphragms and the target means so that the target means moves as the diaphragms move.

10. The sensor of claim 9 and further comprising:
    a housing having a cavity with the diaphragms positioned on opposite sides of the cavity;
    a first tube projecting into the cavity and supporting the target means; and
    a second tube positioned within the first tube for supporting the end of the optical waveguide means in a spaced relationship to the target means.

11. The sensor of claim 10 wherein the means for coupling includes filler material positioned within the cavity.

12. The sensor of claim 10 wherein the housing has a bore which intersects the cavity; and wherein a carrier is positioned in the bore for supporting the first and second tubes.

13. The sensor of claim 12 wherein the carrier has a passage through which the optical waveguide means passes.

14. The sensor of claim 13 wherein an exterior surface of the carrier and an interior surface of the bore include mating conical surfaces.

15. The sensor of claim 14 further including:
    bias means for applying a bias force to maintain the mating conical surfaces in contact.

16. The sensor of claim 15 wherein the carrier is of a material having similar thermal coefficient of expansion properties to the optical waveguide means.

17. The sensor of claim 10 wherein the first and second tubes comprise concentric cylindrical tubes.

18. The sensor of claim 1 wherein the guide means includes:
first optical waveguide means having an output end;
second optical waveguide means having an input end;
lens means positioned adjacent the output end of the first optical waveguide means and the input end of the second optical waveguide means for defining an optical axis therebetween; and
reflector means positioned adjacent the lens means for reflecting the optical beam as received through the lens means from the output end of the first optical waveguide means back through the lens means toward the input end of the second optical waveguide means;
wherein the target means is carried on the input end of the second optical waveguide means, the nonreflective portion of the target means being an aperture through which the optical beam can pass; and
wherein the displacement means causes relative movement of at least one of the ends of the first and second optical waveguide means with respect to the optical axis.

19. The sensor of claim 18 wherein the first optical waveguide means comprises a plurality of optical fibers.

20. The sensor of claim 19 and further comprising means for suporting output ends of the plurality of optical fibers in a linear array.

21. An optical displacement sensor for modulating intensity of an optical beam, the optical displacement sensor comprising:
a housing having a cavity;
a pair of diaphragms positioned on opposite sides of the cavity;
a first tube projecting into the cavity;
target means carried by the first tube and having a nonreflective portion which is adjacent to a reflective portion;
a second tube positioned within the first tube;
optical waveguide means for guiding the optical beam along a path, the optical waveguide means being supported by the second tube and having an end adjacent to and spaced from the target; and
means for coupling together the diaphragms and the first tube so that the target moves relative to the end of the optical waveguide means as the diaphragms move.

22. The sensor of claim 21 wherein the means for coupling includes filler material positioned within the cavity.

23. The sensor of claim 21 wherein the housing has a bore which intersects the cavity; and wherein a carrier is positioned in the bore for supporting the first and second tubes.

24. The sensor of claim 23 wherein the carrier has a passage through which the optical waveguide means passes.

25. The sensor of claim 24 wherein an exterior surface of the carrier and an interior surface of the bore include mating conical surfaces.

26. The sensor of claim 25 further including:
bias means for applying a bias force to maintain the mating conical surfaces in contact.

27. The sensor of claim 26 wherein the carrier is of a material having similar thermal coefficient of expansion properties to the optical waveguide means.

28. The sensor of claim 23 wherein the first and second tubes are concentric cylindrical tubes.

29. An optical displacement sensor for modulating intensity of an optical beam, the optical displacement sensor comprising:
first optical waveguide means having an output end from which the optical beam is transmitted;
second optical waveguide means spaced from the first optical waveguide means and having an input end at which the optical beam is received;
reflector means positioned along a path of the optical beam between the output end of the first optical waveguide means and the input end of the second optical waveguide means;
lens means positioned along the path between the output end of the first optical waveguide means and the reflector means and between the input end of the second optical waveguide means and the reflector means, the lens means defining an optical axis located between the output end of the first optical waveguide means and the input end of the second optical waveguide means;
target means carried on the second optical waveguide means across the input end, the target means having an aperture through which the optical beam can pass, the aperture having been formed in situ by a beam which was transmitted along the first optical waveguide means; and
displacement means for causing relative movement between the optical axis and at least one end of the first and second optical waveguide means to vary a portion of the optical beam which passes through the aperture in the target means.

30. The sensor of claim 29 wherein the first optical waveguide means comprises a plurality of optical fibers.

31. The sensor of claim 29 and further comprising means for suporting output ends of the plurality of optical fibers in a linear array.

32. A method of forming an optical displacement sensor of a type in which an optical beam is directed along a path to a reflector and intensity of the beam received from the reflector is measured to provide an indication of an amount of displacement of the reflector relative to the beam in a direction perpendicular to the path, the method comprising:
placing the sensor in a condition in which the reflector is in a relative position with respect to the beam which is representative of a known displacement;
transmitting along the path a target-forming beam which is capable of causing a change in reflective characteristics of the reflector to produce a nonreflecting area of the reflector which is aligned with the optical beam when the sensor has the known displacement.

33. The method of claim 32 wherein the target-forming beam has an intensity sufficient to form a hole in the reflector, which hole becomes the nonreflecting area.

34. An optical displacement sensor for modulating intensity of an optical beam as a selected function of relative displacement of a target impinged by the optical beam, the optical displacement sensor comprising:
an optical guide adapted for guiding the optical beam along a path, the optical guide including a beam emitting end;

a target surface supported by the target in a plane for impingement by the optical beam after emission of the optical beam from the beam emitting end, the target surface being made of a material susceptible to incident optical radiation of known wavelengths and energy for changing optical properties of the target surface in defined area subjected to the optical radiation;

the optical guide being further adapted for guiding the optical radiation to the target surface at at least a first known relative displacement between the beam emitting end and the target for defining at least a first area of altered optical properties of the target surface; and displacement means for causing relative displacement of the target for moving the target surface in the plane to cause modulation in the intensity of the optical beam after impingement of the optical beam on the target surface as a function of displacement of the target.

35. The sensor of claim 34 wherein the optical properties of the target surface altered are the reflectivity properties of the target surface and each area of altered optical properties is an area of altered reflectivity.

36. The sensor of claim 35 wherein the first area of altered reflectivity is positioned on the target surface of the target where the relative displacement of the target and the optical guide is at a minimum, such that relative displacement of the target from the minimum causes a change in the intensity of reflection of the optical beam.

37. The sensor of claim 36 wherein the susceptible material is gold.

* * * * *

UNITED STATES PATENT AND TRADEMARK OFFICE
CERTIFICATE OF CORRECTION

PATENT NO. : 4,806,016
DATED : February 21, 1989
INVENTOR(S) : Gary P. Corpron, et al.

It is certified that error appears in the above-identified patent and that said Letters Patent is hereby corrected as shown below:

Column 1, line 67, delete "a", insert "an"

Column 3, line 1, delete "cable", insert "cables"

Column 4, line 42, delete "in" (first occurrence), insert "In"

Column 5, line 58, delete "displacment", insert "displacement"

Column 8, line 12, delete "!32", insert "132"

Column 9, line 5, delete "saphire" insert "sapphire"

Column 12, line 41, delete "suporting", insert "supporting"

Column 13, line 10, delete "at" (first occurrence), insert "of"

Signed and Sealed this

Fifteenth Day of August, 1989

Attest:

DONALD J. QUIGG

Attesting Officer

Commissioner of Patents and Trademarks